United States Patent [19]

Chambers

[11] Patent Number: 5,128,904
[45] Date of Patent: Jul. 7, 1992

[54] METHOD FOR ESTIMATING THE LOCATION OF A SENSOR RELATIVE TO A SEISMIC ENERGY SOURCE

[75] Inventor: Ronald E. Chambers, Houston, Tex.

[73] Assignee: Western Atlas International, Inc., Houston, Tex.

[21] Appl. No.: 775,112

[22] Filed: Oct. 11, 1991

[51] Int. Cl.⁵ .............................................. G01S 3/80
[52] U.S. Cl. ...................................... 367/129; 367/19; 367/127
[58] Field of Search ................. 367/19, 55, 118, 124, 367/127, 129

[56] References Cited

U.S. PATENT DOCUMENTS

| | | | |
|---|---|---|---|
| 4,446,538 | 5/1984 | Zachariadis | 367/19 |
| 4,641,287 | 2/1987 | Neeley | 367/19 |
| 4,669,067 | 5/1987 | Roberts | 367/19 |
| 5,031,159 | 7/1991 | Rouquette | 367/125 |

*Primary Examiner*—Ian J. Lobo
*Attorney, Agent, or Firm*—William A. Knox

[57] ABSTRACT

A method is disclosed for determining the separation between a seismic energy source and a seismic sensor, the location of which is known imperfectly. After the source emits a wavefield, the first-arriving impulse at the sensor is statistically processed to form a range statistic that is related to the true travel time between the source and the sensor. A set of range statistics from a plurality of source positions are filtered and converted to range loci, the intersection of which marks the location of the sensor.

9 Claims, 1 Drawing Sheet

5,128,904

METHOD FOR ESTIMATING THE LOCATION OF A SENSOR RELATIVE TO A SEISMIC ENERGY SOURCE

BACKGROUND OF THE INVENTION

1. Field of the Invention

This invention relates to a statistical method for estimating the relative separation between a plurality of seismic transducers disposed along a line of survey, using acoustic ranging.

2. Discussion of the Prior Art

In the art of seismic exploration, a plurality of acoustic sensors are emplaced as along a line of survey. The sensors are connected, at prescribed intervals, to a cable that may be as much as three kilometers or more long. At sea, the cable and its sensors are towed behind a ship; on land, the cable is picked up and moved by truck or other vehicle. At designated stations, also known as shot points, an energy source insonifies the surrounding medium (fires a shot) to generate a wavefield in the subsurface. The wavefield is reflected from subterranean earth layers, to return back to the surface as a seismic-signal wavetrain. The returning seismic signals are detected by the sensors which convert the seismic energy to electrical signals. The electrical signals are transmitted, through suitable conductors in the cable, to a signal utilization device for archival recordation. The received electrical signals are processed by well known means to provide a picture of the attitude of the subsurface earth layers.

At sea, various surveying procedures are used. In deep water, the sensors are mounted in a neutrally-buoyant streamer cable that is towed through the water by a ship with the head end of the streamer trailing one or two hundred meters astern of the ship. An acoustic source, towed between the stern and the head end of the cable, fires a shot in the water at selected time intervals that are timed to occur when the ship passes over designated shot points along the line of survey. Both the sensors and the source continuously move together. The location of the towing ship is known accurately from information furnished by radio-location and/or satellite navigation facilities. Self-contained, sophisticated instrumentation in the streamer cable itself continuously tracks the configuration of the cable relative to the position of the energy source.

Two different methods are used in shallow water. In the more conventional method, a bottom cable, also known as a bay cable, is laid directly on the water bottom by a cable boat along a designated line of survey. The sensors may be distributed in linear or areal arrays. Independently of the cable boat, a shooting boat travels along a line parallel to and offset from the bottom cable. At specified shot points or source positions, determined by radio-ranging or satellite locationing, a shot is fired. The positions of the shot points are known accurately but the locations of the sensors are known only approximately.

A more exotic shallow-water method involves sono-buoys. A buoy boat sows a plurality of sono-buoys, to which one or more sensors is connected, in an areal grid pattern. The shooting boat winds its way through the grid, firing a shot at selected shot points. Seismic signals received by the sensors are sent back to a recording ship by VHF transmissions from the buoys. Although the locations of the sono-buoys were known when they were laid out, by the time the shooting boat arrives on the scene, wind, waves and currents will have forced the buoys to drift out of position. Their locations are only approximately known.

Successful processing of the received seismic signals requires accurate knowledge of not only the locations of the sensors with respect to the energy source but also the locations of the sensors with respect to the world as a whole. In deepwater operations both the source and the sensors move together, towed by the same ship. As pointed out above, sophisticated instrumentation monitors the exact configuration of the sensors with respect to the energy source. In shallow water, where the sensors and the energy source are deployed independently, the separation between the energy source and a sensor is, at best, only a guesstimate.

Various methods have been used in shallow-water operations for defining the relative separation between a known source position and the approximately-known sensor positions. For example, in U.S. Pat. No. 4,446,528, in a marine exploration system, a ship measures the water depth to a seismic cable as it passes over the cable. The ship interrogates the sensors in the cable by means of sonar pulses along a slant range as the ship travels along a parallel and horizontally offset path relative to the cable. The locations of the sensors are measured from recordings of the measured water depths and slant-range travel times.

In another marine method, disclosed in U.S. Pat. No. 4,641,287, a series of seismic interrogation pulses are fired by an energy source. The distance to a sensor is determined for each shot by defining a spherical surface upon which the sensor must be located. The intersection of the spherical surfaces derived from a plurality of shots determines the exact location of the sensor. Depth detectors may be used to eliminate one half of the possible locations for each shot.

The above two references are typical of known methods for locating the positions of sensors with respect to an energy source, but the application is limited to marine operations. Specialized equipment is needed such as the sonar system of the '528 patent or the special pinger boat of the '287 patent. Furthermore, neither system would be suitable for land use.

A fatal problem with the known systems is the fact that is assumed by the user that an interrogation signal as received at a sensor is a clean Dirac function. That is, it is assumed that the received acoustic signal is recorded as a sharp spike whose arrival time can be picked with precision relative to the instant of emission of the interrogation signal. In the real world, that assumption is unrealistic because ambient noise, as well as the filtering effect of the medium through which the sonic interrogation pulse travels, severely degrades and contaminates the received signal. The recorded signal is usually fuzzy and indeterminate.

The function of this disclosure is two-fold: To teach a statistical method for estimating the position of a sensor from the intersection of range loci determined from noisy wavefields emitted by a seismic energy source and to provide a method that is equally adaptable to land or marine use without need for special field equipment.

SUMMARY OF THE INVENTION

An acoustic source emits a seismic wavetrain from a plurality of source positions. For each source position, a sensor detects the signature of the wavetrain that traveled along a substantially direct travel path from the source to the sensor. The signature is digitized to provide a discrete time series which is rectified to form an amplitude vector. A prediction operator is applied to the amplitude vector to transform it to a pick vector. The pick vector is transformed to a set of pseudo variances that are related to the true arrival time of the wavetrain at the sensor. The least pseudo variance value is selected as a range statistic. A set of range statistics is formed from the range statistics gleaned from each of the source positions. The set of range statistics is filtered to define the weighted location of the sensor with respect to the source.

The acoustic wavetrain propagation velocity and a differential elevation may be combined with the range statistics prior to the step of filtering.

The sensor location may be approximated and the approximate location combined with the elevation differential and the propagation velocity prior to filtering.

BRIEF DESCRIPTION OF THE DRAWINGS

These and other benefits of this invention will be better appreciated from the appended detailed description and the drawings, wherein.

DETAILED DESCRIPTION OF THE PREFERRED EMBODIMENT

For purposes of illustration and example but not by way of limitation, this invention will be explained with reference to sono-buoys such as are used for seismic exploration in shallow water. In this disclosure, the word "velocity" will be used as a short-hand term that means the velocity of propagation of an acoustic wavefield through a medium that lies between an acoustic energy source and an acoustic sensor.

Figure 1:
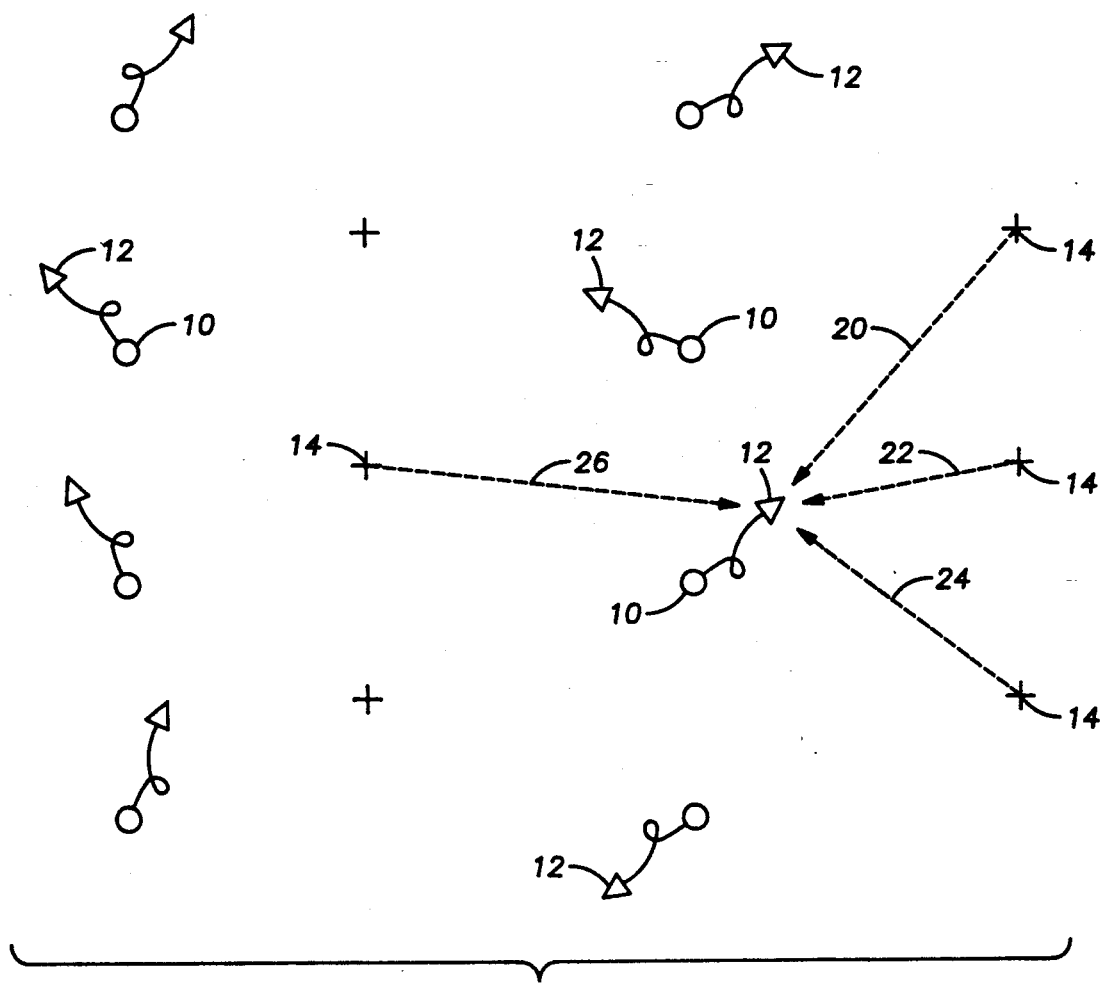
FIG. 1 illustrates a grid of sono-buoys distributed over an area to be surveyed.

In FIG. 1, there is shown a plurality of sono-buoys such as 10, shown as circles, each of which has a sensor such as 12, shown as a triangle, connected thereto. The sono-buoys are distributed over an areal grid pattern as shown. The sensors are shown to have drifted randomly from the actual buoy locations. A shooting boat (not shown) occupying known positions, fires a shot at selected shot points such as 14, shown as crosses. The resulting seismic wavefield signature is detected by a sensor and is recorded for later processing.

Ideally, the signature of the first-arriving energy that travels through the water along a direct path from a shot to a sensor is a spike 16 as shown in analog format shot and the sensor. The intersection of a plurality of range loci such as 22, 24 and 26 from a corresponding plurality of known energy source positions defines the location of sensor 12.

Figure 3:
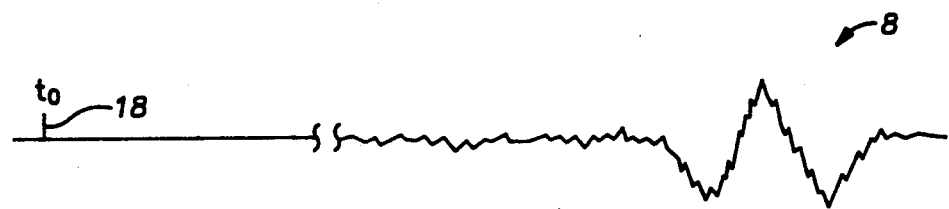
FIG. 3 is the first-arrival signature contaminated with noise.

As before stated, noise and the environmental filtering effect of the propagating medium degrade the signature into a low-frequency wavetrain 28 that is contaminated with high-frequency noise as shown in analog format in FIG. 3. It is not possible to accurately pick the true onset of the first arrival. Because the exact first-arrival time usually cannot be picked reliably, the intersecting range loci calculated from raw seismic data are subject to significant error. A computer-aided statistical method, now to be explained, will be used to estimate the most likely separation between an energy source position and a sensor location.

Since the location of the sensor is known approximately, a search window is established having a time width, such as 0.5 second, sufficient to bracket the probable travel time of the first arrival from a source to a sensor with due regard to the locational uncertainty of the sensor. Within the search window, the amplitude of the corresponding recorded analog trace is sampled at convenient sample intervals such as every four milliseconds (ms) to form a discrete time series.

In the preferred process, the samples within the search window are rectified and converted to an amplitude vector A. Using a p-point prediction operator and an a-point anticipation operator, the amplitude vector is converted to a pick vector, P. The pick vector is then transformed into a set of pseudo variance values E. The time delay corresponding to the sample number that exhibits the least pseudo variance value is defined as a range statistic that is related to the true first-arrival time.

A detailed numerical example will now be presented to illustrate a preferred method of practicing this invention.

Consider the set of numbers below:

| −10 | −1 | 10 | 20 | −20 | 30 | −100 | −250 | −1750 | −150 | f(t) |
|---|---|---|---|---|---|---|---|---|---|---|
| 10 | 1 | 10 | 20 | 20 | 30 | 100 | 250 | 1750 | 150 | A |
| 0 | 8 | 12 | 22 | 33 | 265 | 229 | 16 | 0 | 0 | P |
| 1015 | 355 | 222 | 125 | 84 | 15 | 17 | 166 | 603 | 1013 | E |

The data set in the first line, f(t), is a discrete time series of an arbitrarily-chosen group of trace-amplitude samples extracted from within a search window, centered around the probable first-arrival time. The recorded trace amplitudes are measured in arbitrary units at 4-ms intervals. The next line lists the amplitude vector, A. In this example, the amplitude vector is formed by simply rectifying the trace amplitudes, that is, by taking their absolute values. Employing a more sophisticated approach, the amplitude vector A, could also be formed by deconvolving f(t) or by taking second derivatives of f(t) prior to the step of rectifying.

A pick operator is defined as follows:

```
PPPPPPPPPPGGGGGGGGGGGAAAAAAAAAA
 PPPPPPPPPPGGGGGGGGGGGAAAAAAAAAA
  PPPPPPPPPPGGGGGGGGGGGAAAAAAAAAA
   PPPPPPPPPPGGGGGGGGGGGAAAAAAAAAA
```

Figure 2:
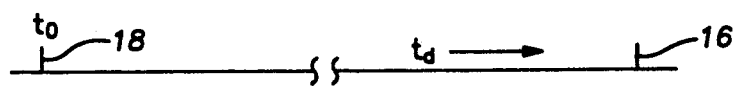
FIG. 2 is an idealized first-arrival signature.

$t_o \ldots \ldots \ldots \ldots t_s \longrightarrow \ldots \ldots \ldots \ldots \ldots \ldots \ldots \ldots \ldots \ldots \ldots \ldots t_w$ in FIG. 2. The delay time $t_o$ between the firing instant 18 of the shot and the time of the first arrival 16, multiplied by the velocity provides a range locus 20 between the where $t_o$ is the firing instant of the source, $t_s$ is a sample time and $t_w$ is the time at the end of the search window.

The pick operator is applied to the members of the amplitude vector to form a pick vector, P. The kth pick in line P is calculated by comparing the energy in P with the energy in A, employing the formulation given immediately below. For purposes of this example, we shall use a 4-sample prediction operator and a 3-sample anticipation operator. The length of the gap, G, is selected on the basis of the frequency content of the expected first arrival. A low-frequency arrival requires a longer gap. In the example, for simplicity, the gap length is zero.

The value of the kth pick, $P_k$, is determined from:

$$P_k = \frac{\sum_{i=k+g}^{i=k+g+a} A_i}{\sum_{i=k+p+1}^{i=k} A_j}$$

where
p = prediction operator length in samples,
g = gap length in samples,
a = anticipation operator length in samples,
k = 0, 1, 2, . . . ,w, that is, the sample number and
w = length of search window in samples.

The pick vector, P, is transformed to a set of pseudo-variance values by $$E_i = \left[ \frac{P_m - P_i}{\max (P_m * s, P_i)} \right]^T + V$$

where
T is an arbitrary integer equal to or greater than unity,
$P_m$ is the largest value of the $P_i$, and
V = 1.5.
In the denominator, the maximum of either the quantity ($P_m * s$) or $P_i$ is chosen. The scaler
s = 0.01
is used to avoid a possible division by zero. The sample time corresponding to the least value of the $E_i$ is defined to be a range statistic related to the first arrival time.

The parameters needed to define a range locus between a known source position and an approximate sensor location are: The range statistic, the velocity, the approximate location of the sensor and the differential elevation (water depth) difference between the source position and the sensor location. All of those quantities, when measured in the field, are subject to measurement uncertainties. The best estimate of the true range locus to a sensor location from a known source position may be determined by introducing those quantities into a statistical prediction filter of any desired type, such as the well-known Kalman filter. For a given sensor such as 12 in FIG. 1, the range loci from several different known source positions are constructed as shown. The intersection of the range loci marks the weighted location of the sensor.

In the happy circumstance wherein the quantities of velocity and differential elevation are invariate and known, the weighted sensor location could be derived directly from the filtered range statistics.

The above processing is applied for all source positions and all sensor locations. The computer-aided processing program is constrained such that only a limited number of source positions are used for estimating the location of any one sensor. If the sensors or sources are configured in arrays, the program extrapolates the sensor location to the center of the array.

This invention has been described in the context of use of a plurality of known source positions to pin-point a sensor whose location was initially only approximated. The method of course, may be applied to the equivalent inverse case involving a plurality of known receiver locations with respect to an approximated source position.

The advantage of this method is that no special field equipment is needed; the normal routine seismic shots provide the required interrogation signals. It is standard field practice to measure the wavelet velocity and the differential elevation between a source and the sensors so no special activity is required to acquire those numbers. This invention may be applied over land or sea. The only requirement is that the wavelet follows a substantially direct travel path between the source and the receiver.

The method and its equivalent inverse have been described with a certain specificity as applied to sonobuoys for sake of example, but the method may be applied to bottom cables, land cables or even to deep-water streamer cables if so desired. Other data-massaging techniques may be conceived of by those skilled in the art but which will fall within the scope and spirit of this disclosure which is limited only by the appended claims.

I claim as my invention:

1. A method for estimating the separation between an acoustic source and an acoustic sensor, comprising:
   causing an acoustic source to emit an acoustic wavelet from each of a plurality of source positions;
   for each said source position:
   a. detecting the signature of the emitted acoustic wavelet, propagating along a substantially direct travel path to said sensor,
   b. measuring the amplitude of said detected signature at desired sample-time intervals to define a discrete time series,
   c. rectifying the samples in said time series to define an. amplitude vector,
   d. applying a pick operator to said amplitude vector to form a pick vector,
   e. transforming said pick vector to a discrete series of pseudo variance values,
   f. selecting the sample time corresponding to the least value from said discrete series of pseudo variances as a range statistic related to the true arrival time of said wavelet;
   forming a set of range statistics for said sensor location from the range statistics gleaned from each of the respective plurality of source positions; and
   filtering said set of range statistics to define the weighted location of said sensor with respect to said source positions.

2. The method of claim 1, comprising:
   measuring and combining the parameters of differential elevation between said source and said sensor, the velocity and said range statistics prior to the step of filtering.

3. The method as defined by claim 2, comprising:
   approximating the location of said sensor relative to known positions of said source, and
   combining the approximate location with said set of range statistics, said differential elevation and the velocity prior to the step of filtering.

4. The method as defined by claim 1, comprising:

deconvolving the discrete time series prior to the step of rectifying.

5. The method as defined by claim 1, comprising:
taking the second derivative of said discrete time series prior to the step of rectifying.

6. A method for estimating the location of a seismic sensor relative to a seismic source, comprising:
emitting an acoustic wavelet from said source at each of a plurality of source positions;
for each source position:
a. detecting the signature of the emitted acoustic wavelet propagating along a substantially direct travel path to said sensor;
b. defining a discrete time series by measuring the amplitude of said detected signature at desired sample-time intervals within a search window of pre-selected length;
c. transforming said discrete time series to a discrete series of pseudo variance values;
d. selecting the least value from said discrete series of pseudo variances as a range statistic related to the true arrival time of said wavelet at said sensor;
forming a set of range statistics for said sensor from the range statistics gleaned from the respective source positions; and
filtering said set of range statistics to define the weighted location of said sensor with respect to said source positions.

7. The method as defined by claim 6, comprising:
approximating the location of said sensor with respect to known positions of said source;
measuring and combining the parameters of differential elevation between said approximated sensor location and said source positions and the velocity of said wavelet with said range statistics and said approximated sensor location prior to the step of filtering.

8. A method for estimating the location of a seismic sensor relative to a seismic source, comprising:
emitting an acoustic wavelet from said source;
at each of a plurality of sensor locations:
a. detecting the signature of the emitted acoustic wavelet propagating along a substantially direct travel path from said source to said sensors,
b. defining a discrete time series by measuring the amplitude of said detected signature at desired sample-time intervals,
c. transforming said discrete time series to a discrete set of pseudo-variance values,
d. selecting the least value from said set of pseudo-variance values as a range statistic related to the true arrival time of said wavelet at said sensor;
forming a set of range statistics for said source from the range statistics calculated for the respective sensor locations; and
filtering said set of range statistics to define the weighted position of said source relative to said sensor locations.

9. The method as defined by claim 8, comprising:
approximating the position of said source relative to known locations of said sensors;
measuring and combining the differential elevation and the velocity with the approximate position of said source and the set of range statistics prior to the step of filtering.

* * * * *